United States Patent [19]

Hale et al.

[11] 4,264,554

[45] Apr. 28, 1981

[54] PROCESS FOR MELT CUTTING ETHYLENE POLYMERS

[75] Inventors: Alan D. Hale, Orange, Tex.; Charles V. Murphy, Wilmington, Del.

[73] Assignee: E. I. Du Pont de Nemours and Company, Wilmington, Del.

[21] Appl. No.: 153,459

[22] Filed: May 27, 1980

Related U.S. Application Data

[63] Continuation of Ser. No. 10,047, Feb. 6, 1979, abandoned.

[51] Int. Cl.³ .............................................. B28B 11/16
[52] U.S. Cl. ..................................... 264/142; 264/130
[58] Field of Search ................................ 264/142, 130

[56] References Cited

U.S. PATENT DOCUMENTS

| T957,005 | 4/1977 | Gorman | 264/140 |
|---|---|---|---|
| 3,755,526 | 8/1973 | Watanabe | 264/178 Z |
| 3,892,834 | 7/1975 | Pritchard | 264/142 |

*Primary Examiner*—Jay H. Woo

[57] ABSTRACT

An improved process for melt cutting ethylene polymers is provided wherein the improvement comprises adding to the melt cutter water a small amount of nonionic or anionic surfactants thereby significantly increasing the agglomeration temperature of the ethylene polymer. This allows for an increase in melt cutting capacity and productivity.

7 Claims, No Drawings

PROCESS FOR MELT CUTTING ETHYLENE POLYMERS

This is a continuation of application Ser. No. 010,047, filed Feb. 6, 1979 now abandoned.

BACKGROUND OF THE INVENTION

1. Field of the Invention

This invention relates to melt cutting and more specifically it relates to an improved process for the melt cutting of ethylene polymers.

2. Description of the Prior Art

The use of surfactants is wide spread in many applications. For example, ethylene oxide and propylene oxide copolymer surfactants are disclosed in U.S. Pat. Nos. 3,422,049, and 3,432,483, as aiding the preparation of dispersions of polymers with particle sizes of below 10 microns to not greater than 25 microns and in U.S. Pat. No. 4,007,247 for the preparation of fibrils, i.e., short fibers having diameters less than 25 microns and preferably less than 10 microns. All three of these patents disclose water dispersion processes for polymer particle size reduction using high temperatures and pressures as well as high speed agitation and surfactants.

U.S. Pat. No. 3,528,841 deals with reducing the tackiness of polymer pellets by applying a small particle size (less than 10 microns) polyolefin powder dispersed in water on the surface of the soft, sticky polymer to reduce its tackiness. In the alternative, the polyolefin powder coating can also be applied to the polymer by tumbling or by airveying. The purpose of applying this coating is to facilitate getting the product through the drying and purge steps of the production process and to supply a free flowing product to the trade.

Chemical Abstracts digest 87:153195p, Vol. 87, 1977 p. 48, entitled "Agglomeration prevention during stream-stripping of solvents from rubber solutions" involves the use of a 1000-3000 molecular weight ethylene oxide/propylene oxide copolymer as a surfactant in a water/hydrocarbon solvent dispersion. Thus, a 20% solids butadiene solution in hexane was steam-stripped in a 0.005 weight percent solution of the above surfactant in water. This mixture forms a dispersion (oil in water at about 5 to 6% solids) and establishes the particle size of the rubber crumbs (average diameter 3.7 mm). The surfactant's function is to make the two imcompatible phases, namely, hexane and water into one compatible phase. Steam stripping is used to obtain a single liquid (water) phase, ending up with an 8% solids slurry. The process involves forming a particle size in dispersion form from a solution of the rubber in a hydrocarbon solvent.

SUMMARY OF THE INVENTION

According to the present invention there is provided an improved process for melt cutting ethylene polymers, which process comprises extruding the molten thermoplastic polymer through one or more orifices into water and cutting the extruded strand as it undergoes solidification, wherein the improvement comprises adding to the water from about 1 to about 1000 ppm by weight of at least one surfactant selected from the group consisting of non-ionic and anionic surfactants that will increase by at least 10° C. the agglomeration temperature of an ethylene polymer that has an agglomeration temperature of from about 50° C. to about 60° C., said surfactant having a hydrophilic/lipophilic balance (HLB) range of from about 10 to about 45.

DETAILED DESCRIPTION OF THE INVENTION

Surprisingly it was found that the addition of small quantities of a non-ionic surfactant to the melt cutter water significantly increased the agglomeration temperature of soft ethylene/vinyl acetate copolymers. In the context of the present invention, the term "agglomeration temperature" means the agglomeration temperature of extruded, hot, cut pellets in water. Agglomeration temperature is determined by the process described below under "Laboratory Testing Procedure". This increase in the agglomeration temperature results in an increase in melt cutting capacity and productivity.

Surfactants that are contemplated for use by the present invention are non-ionic and anionic surfactants that will increase by at least 10° C. the agglomeration temperature of an ethylene polymer that has an agglomeration temperature of from about 50° C. to about 60° C. Suitable surfactants have a hydrophilic/lipophilic balance (HLB) range of from about 10 to about 50.

Non-ionic surfactants are preferred and the preferred class of non-ionic surfactants are homo- and copolymers of olefin oxides wherein the olefin moiety contains up to 3 carbon atoms, such as ethylene and propylene oxide homo- and copolymers. The preferred (HLB) range is from about 20 to about 35.

A high molecular weight "Pluronic" polyol, an α-hydro-omega-hydroxy-poly(oxyethylene) poly(oxypropylene) poly(oxyethylene) block copolymer with an HLB range of about 10 to about 35 is the most preferred surfactant. Other non-ionic surfactants, however, such as oxyethylated straight chain alcohols, octyl phenoxy polyethoxy ethanol, ethylene oxide polymers and a reverse "Pluronic" 25-R-8 [poly(oxypropylene)-poly(oxyethylene)-poly(oxypropylene) block copolymer] also significantly raised the agglomeration temperature of ethylene polymers in water.

At essentially equivalent HLB values the higher molecular weight polymers appear to be most effective.

The range of concentration for the melt cutter additive surfactant of the present invention is from about 1 to about 1000 parts per million (ppm) based upon the weight of the melt cutter water. The preferred range for the more effective surfactants is from about 1 to about 100 ppm.

Although the increased agglomeration temperature obtained by the process of the present invention was discussed in terms of ethylene/vinyl acetate (EVA) copolymers it is to be understood that the present invention applies to other soft ethylene polymers as well where tackiness and agglomeration are of concern.

It is very important in the manufacture of polymers used in adhesives that the concentration of additives used in processing these polymers be as low as possible so as not to result in an adverse effect on critical adhesive properties. As illustrated below in the examples, surfactants of the present invention show no adverse affect on adhesion in the critical adhesion to aluminum test at concentrations of 20 ppm, as well as even up to 2000 ppm in some instances.

Illustrative examples of commercially available surfactants are "Pluronic" F-98, "Pluronic" F-108, "Plurafac" A-38, "Pluronic" F-38, "Pluronic" 25R-8, "Sipon" L-22, "Carbowax" 20 M, "Pluronic" P-104, "Triton" X-100.

The following examples are given for the purpose of illustrating the present invention. All parts and percentages are by weight unless otherwise specified.

LABORATORY TESTING PROCEDURE

These tests were made using a 10/1 water/polymer ratio. Ethylene/vinyl acetate copolymer pellets were agitated in ambient temperature water using mild paddle-type agitation that will assure the movement of pellets in the water. The temperature of the water was gradually increased until significant agglomeration had occurred. In the case of untreated Elvax ® 210, the first indication of tackiness occurred at approximately 50° C. (3 to 5 pellets agglomeration around the thermometer and agitator shaft). The second indicator was larger agglomerates (¼" to ½") forming at a temperature of 54° C. The third and final indicator was significant agglomeration (large clump 1" to 2" in diameter) occurring at a temperature of 58° C. This is the temperature considered as the agglomeration temperature of Elvax ® 210. In this study, the various melt-cutter additives were dissolved in the water prior to adding the ethylene/vinyl acetate copolymer pellets.

EXAMPLE 1

This example demonstrates the effect of "Carbowax" 20 M, a very slightly crosslinked ethylene oxide copolymer (for further characterization see Table I), as a melt-cutter additive in laboratory tests to increase the agglomeration temperature of soft polymer grades of EVA [e.g., Elvax ® 40, (40% VA, 57 M.I.), Elvax ®, 150 (33% VA, 43 M.I.) and Elvax ® 210 (28% VA, 400 M.I.)]. These tests were merely scouting tests without full attention being paid to the adequacy of agitation required to assure submersion of the pellets in the surfactant containing water. Accordingly the results are merely a rough indication of the effect of the surfactant. The tests involved the addition of 2500 ppm of "Carbowax" 20 M (based on the weight of the water) agitated with a magnetic stirrer. No agglomeration occurred at 70° C. for Elvax ® 40 and and 150. Pellets of Elvax ® 210 were about 60% agglomerated at 70° C. Additional tests were run using Elvax ® 40 at 1250 and 500 ppm based on the water, and these tests showed no agglomeration up to 70° C.

EXAMPLE 2

This example demonstrates the effect of "Pluronic" F-98 and F-108, ethylene oxide-propylene oxide-ethylene oxide block copolymers (for further characterization see Table I), as melt-cutter additives in laboratory tests to increase the agglomeration temperature of soft polymer grades of EVA (such as, Elvax ® 210). Following the same procedure described under Laboratory Testing Procedure, the following results were obtained:

| Melt-Cutter Additive | Melt-Cutter Additive (ppm based on H₂O) | Agglomeration Temperature (°C.) |
|---|---|---|
| Control | 0 | 58 |
| "Pluronic" F-98 | 0.5 | 65 |
| "Pluronic" F-98 | 1.0 | 71 |
| "Pluronic" F-98 | 2.0 | 87 |
| "Pluronic" F-98 | 10.0 | 94 |
| "Pluronic" F-108 | 0.5 | 65 |
| "Pluronic" F-108 | 1.0 | 70 |
| "Pluronic" F-108 | 2.0 | 88 |
| "Pluronic" F-108 | 10.0 | 94 |

EXAMPLES 3–6 AND COMPARATIVE EXAMPLES 1–9

These examples represent the evaluation of samples from various classes of surfactants (e.g., nonionic, anionic, and cationic) in the laboratory melt-cutting study on Elvax ® 40, 150 and 210. The results are shown in Tables I and II.

TABLE I
EFFECT OF MELT-CUTTER ADDITIVES ON AGGLOMERATION TEMPERATURE OF ELVAX ® 210

| Examples | Melt-Cutter Additive | Chemical Composition | Surface Tension Dynes/Cm. 0.1%[3], 25° C. |
|---|---|---|---|
| C1 | No Additive (Control) | — | — |
| 3 | "Pluronic" F-108 | α hydro-omega-hydroxy-poly-(oxymethylene) poly(oxypropylene) poly(oxyethylene) block copolymer | 41.2 |
| 4 | "Pluronic" F-98 | | 43.0 |
| 5 | "Pluronic" F-38 | | 52.2 |
| 6 | "Pluronic" P-104 | | 33.1 |
| 7[5] | "Pluronic" L-121[2] | | 39.6 |
| C2 | "Pluronic" L-43 | | 47.3 |
| 8 | "Plurafac" A-38 | Oxyethylated Straight Chain Alcohol | 43.6 |
| 9 | "Triton" X-100 | Octylphenoxy-polyethoxy ethanol | 31.0 |
| 10 | "Carbowax" 20M | Very slightly crosslinked ethylene oxide polymer | 52.0 @ 50% by Wt. |
| 11 | "Pluronic" 25R-8 | α hydro-omega-hydroxy-poly(oxypropylene) poly(oxyethylene) poly(oxypropylene) block copolymer | 46.1 |
| C3 | "Polyox" WSRN-10 | More highly crosslinked ethylene oxide copolymer | |
| C4 | "Polyox" WSRN-750 | | |
| C5 | "Polyox" WSR-205 | | |
| C6 | "Polyox" WSR-1105 | | |
| 12 | "Sipon" L-22 | Ammonium Salt of Lauryl Sulfate | |
| C7 | "Atlas" G-263 | n-cetyl-n-ethyl morpholineum | |

| Examples | Surfactant Type | HLB Factor | Average Mol. Wt. | 95° C. Agglomeration Temperature[1] (ppm Based on Water) |
|---|---|---|---|---|
| C1 | — | — | — | Agglomerates @ 58° C. |
| 3 | Nonionic | 27.0 | 14,000 | 13 |
| 4 | Nonionic | 27.5 | 13,500 | 13 |
| 5 | Nonionic | 30.5 | 5,000 | 30 |
| 6 | Nonionic | 13.0 | 5,850 | 30 |
| 7 | Nonionic | 0.5[5] | 4,400 | 75° C. @ 1000 ppm |
| C2 | Nonionic | 13.5 | 1,850 | 67° C. @ 1000 ppm |
| 8 | Nonionic | 20 | 1,420 | 38 |
| 9 | Nonionic | 13.5 | 628 | 295 |
| 10 | Nonionic | 20 | 14,000–20,000 | 440 |

TABLE I-continued
EFFECT OF MELT-CUTTER ADDITIVES ON AGGLOMERATION TEMPERATURE OF ELVAX ® 210

| | | | | |
|---|---|---|---|---|
| 11 | Nonionic | 30.3 | 9,000 | 465 |
| C3 | Nonionic | 20 | 100,000 | 62° C. @ 1000 ppm |
| C4 | Nonionic | 20 | 300,000 | 63° C. @ 1000 ppm |
| C5 | Nonionic | 20 | 600,000 | 63° C. @ 1000 ppm |
| C6 | Nonionic | 20 | 900,000 | 63° C. @ 1000 ppm |
| 12 | Anionic | 31 | — | 875 |
| C7 | Cationic | 30 | — | 66° C. @ 1000 ppm |

| | Agglomeration Temperature (°C.) at Indicated Surfactant Level (ppm)[4] | | | | | | |
|---|---|---|---|---|---|---|---|
| Ex. | 0 | 0.5 | 1.0 | 2.0 | 2.5 | 5 | 10 | 20 |
| C1 | 58 | — | — | — | — | — | — | — |
| 3 | 58 | 65 | 70 | 88 | — | — | 94 | — |
| 4 | 58 | 65 | 71 | 87 | — | — | 94 | — |
| 5 | 58 | — | — | — | — | — | 62 | 68 |
| 6 | 58 | — | — | — | — | 67 | 90 | — |
| C2 | 58 | — | — | — | — | — | — | — |
| 7 | 58 | Insoluble in Water[5] | | | | | | |
| 8 | 58 | — | 65 | — | — | — | 68 | 91 |
| 9 | 58 | — | — | — | — | — | — | — |
| 10 | 58 | — | — | — | — | — | — | 63 |
| 11 | 58 | — | — | — | — | 63 | — | — |
| 12 | 58 | — | — | — | — | 61 | — | — |
| C3 | 58 | 60 | 60 | 62 | — | — | 62 | — |
| C4 | 58 | 62 | 63 | 63 | — | — | 63 | — |
| C5 | 58 | 63 | 63 | 63 | — | — | 63 | — |
| C6 | 58 | 63 | 63 | 63 | — | — | 63 | — |
| C7 | 58 | — | — | — | — | 63 | — | — |

| | Agglomeration Temperature (°C.) at Indicated Surfactant Level (ppm)[4] | | | | | | |
|---|---|---|---|---|---|---|---|
| Ex. | 30 | 40 | 50 | 100 | 200 | 300 | 500 | 1000 |
| C1 | — | — | — | — | — | — | — | — |
| 3 | — | — | — | — | — | — | — | — |
| 4 | — | — | — | — | — | — | — | — |
| 5 | >97 | — | — | — | — | — | — | — |
| 6 | — | — | — | >97 | — | — | >97 | >97 |
| C2 | — | — | — | 65 | — | — | 67 | 67 |
| 7 | Insoluble in Water[5] | | | | | | | |
| 8 | — | — | — | — | — | — | — | — |
| 9 | — | — | — | 65 | 69 | >97 | — | — |
| 10 | — | — | 77 | 84 | — | — | >97 | — |
| 11 | — | — | 67 | 70 | 79 | — | >97 | — |
| 12 | — | — | 61 | — | — | — | 67 | >97 |
| C3 | — | — | — | — | — | — | — | 60 |
| C4 | — | — | — | — | — | — | — | 60 |
| C5 | — | — | — | — | — | — | — | 61 |
| C6 | — | — | — | — | — | — | — | 64 |
| C7 | — | — | 63 | — | — | — | 65 | 66 |

[1] except where indicated otherwise
[2] limited solubility in water
[3] wt. % concentration
[4] based on water
[5] not an example of the present invention, HLB factor = 0.5, insoluble in water

TABLE II
Effect Of Melt-Cutter Additives On Agglomeration Temperature Of Elvax ® 40 and 150

| | | Agglomeration Temperature (°C.) at indicated surfactant level (ppm)[1] | | | | | | |
|---|---|---|---|---|---|---|---|---|
| Ex. | Additive | 0 | 0.5 | 1.0 | 2.0 | 2.5 | 5 | 10 | 20 |
| C8 | None | 45 | — | — | — | — | — | — | — |
| C9 | None | 55 | — | — | — | — | — | — | — |
| 13 | "Pluronic" F-98 | 45 | — | — | — | — | — | — | — |
| 14 | "Pluronic" F-98 | 55 | — | — | >85 | >85 | — | — | — |
| 15 | "Pluronic" F-108 | 45 | — | — | — | — | — | — | — |
| 16 | "Pluronic" F-108 | 55 | — | — | — | 90 | — | 92 | — |

Effect Of Melt-Cutter Additives On Agglomeration

| | Agglomeration Temperature (°C.) at indicated surfactant level (ppm)[1] | | | | | | |
|---|---|---|---|---|---|---|---|
| Ex. | 30 | 40 | 50 | 100 | 200 | 300 | 500 | 1000 |
| C8 | — | — | — | — | — | — | — | — |
| C9 | — | — | — | — | — | — | — | — |
| 13 | — | — | >85 | — | — | — | — | — |
| 14 | — | — | — | — | — | — | — | — |
| 15 | — | — | 96 | — | — | — | — | — |
| 16 | — | — | >95 | — | — | — | — | — |

[1] based on water

EXAMPLES 17–22

The effect of the concentration of "Pluronic" F-98 in the melt-cutter water on the adhesive properties of Elvax ® 40 to aluminum foil was studied. The results summarized in Table III show that up to and including 2,000 ppm of additive (based on the water) had little or no effect on adhesion properties.

EXAMPLE 23 AND COMPARATIVE EXAMPLE 10

The use of 20 ppm "Pluronic" F-98 as a melt-cutter additive was evaluated on a commercial scale in a continuous melt-cutter process for making one of the slower cutting grades of polymer, Elvax ® 210. This resulted in nearly a 50% increase in melt-cutting rates. This product, as well as a control product of Elvax ® 210, was evaluated for color, odor, gel content, and adhesion to aluminum foil, both as is and after aging. The results were summarized in Table IV. "Pluronic" F-98 melt-cutter additive had no adverse effect on any of the above properties.

ESCA (electron spectroscopy for chemical analysis) determination of the above Elvax ® 210 processed using 20 ppm "Pluronic" F-98 based on the melt-cutter water show 0.12 ppm surfactant on the polymer pellets on an 80% confidence level or 0.34 ppm based on 95% confidence level.

EXAMPLES 24–27 AND COMPARATIVE EXAMPLES 11–14

These examples show the effect of nonionic melt cutter additives on the agglomeration temperature of four soft ethylene terpolymer resins. The tests were run according to the Laboratory Testing Procedure described above. The data, summarized in Table V, show for the first three polymers that the addition of a nonionic surfactant (Pluronic ® F-98), at a concentration of 20 parts per million (ppm) based on the water, significantly increased their agglomeration temperature. For the fourth polymer, E/MA/MAME, 50 ppm Pluronic ® F-108 based on the water, significantly increased the agglomeration temperature of this terpolymer.

TABLE III
EFFECT OF CONCENTRATION OF "PLURONIC" F-98 ON ADHESIVE PROPERTIES OF ELVAX ® 40

| | Melt-Cutter Additive ppm[1] | Peel Strength Data (lbs./inch) Heat Seal, 5-Mil Aluminum[2] | | | |
|---|---|---|---|---|---|
| | | 248° F. | | 350° F. | |
| Ex. | | Peel | Std. Deviation | Peel | Std. Deviation |
| C10 | 0 | 3.45 | 0.17 | 6.1 | 1.06 |
| 17 | 5 | 2.75 | 0.53 | 3.85 | 0.23 |
| 18 | 10 | 2.9 | 0.60 | 4.5 | 0.86 |
| 19 | 20 | 3.58 | 0.36 | 4.83 | 0.33 |
| 20 | 200 | 3.1 | 0.16 | 4.38 | 0.21 |
| 21 | 2,000 | 3.65 | 0.10 | 4.68 | 0.31 |

TABLE III-continued

EFFECT OF CONCENTRATION OF "PLURONIC" F-98 ON ADHESIVE PROPERTIES OF ELVAX® 40

| Ex. | Melt-Cutter Additive ppm[1] | Peel Strength Data (lbs./inch) Heat Seal, 5-Mil Aluminum[2] | | | |
|---|---|---|---|---|---|
| | | 248° F. | | 350° F. | |
| | | Peel | Std. Deviation | Peel | Std. Deviation |
| 22 | 20,000 | 0.75 | 0.31 | 1.48 | 0.13 |

[1] Based on melt-cutter water.
[2] Heat Seal Conditions: Pressure = 20 psi; Dwell Time = 6 seconds each side.

TABLE IV

| | Example | |
|---|---|---|
| | C-10 | 23 |
| | No Additive | 20 ppm "Pluronic" F-98 |
| Pellet Appearance | Normal | Normal |
| Peel Strength[1], lbs./in. | | |
| Initial | | |
| Sealing Temp. 120° C. | .47 | .46 |
| Sealing Temp. 177° C. | 3.8 | 5.3 |
| Aged 1 Week | | |
| Sealing Temp. 120° C. | .43 | .73 |
| Sealing Temp. 177° C. | 4.0 | 3.6 |

[1] Sealed to aluminum foil 6 seconds, 20 psi.

TABLE V

EFFECT OF "PLURONIC" F-98 & F-108 MELT-CUTTER ADDITIVES ON THE AGGLOMERATION TEMPERATURE OF ETHYLENE POLYMERS

| Ex. | Polymer | Composition | Melt Index | Melt-Cutter Additive (ppm based on water) | Agg. Temp. (°C.) |
|---|---|---|---|---|---|
| C11 | E/VA/CO[3] | 61/29/10 | 35 | 0 | 52 |
| 24 | E/VA/CO[3] | 61/29/10 | 35 | 20 (F-98) | 93 |
| C12 | E/VA/MAA[4] | 74/25/1 | 500 | 0 | 62 |
| 25 | E/VA/MAA[4] | 74/25/1 | 500 | 20 (F-98) | 92 |
| C13 | E/MA/CO[1] | 64.2/22.7/13.1 | 81 | 0 | 60 |
| 26 | E/MA/CO[1] | 64.2/22.7/13.1 | 81 | 20 (F-98) | 95 |
| C14 | E/MA/MAME[2] | 43/53/4 | 9 | 0 | 61 |
| 27 | E/MA/MAME[2] | 43/53/4 | 9 | 50 (F-108) | 97 |

[1] Ethylene/methyl acrylate/carbon monoxide copolymer.
[2] Ethylene/methyl acrylate/monoethylester of maleic acid copolymer.
[3] Ethylene/vinyl acetate/carbon monoxide copolymer.
[4] Ethylene/vinyl acetate/methacrylic acid copolymer.

Agglomeration temperatures of various Elvax® grades are indicated on Table VI below.

TABLE VI

Agglomeration Temperature of Elvax® Grades

| Elvax® | Melt Index | Vinyl Acetate % | Agglomeration Temperature (°C.) |
|---|---|---|---|
| 40 | 57 | 40 | 45 |
| 150 | 43 | 33 | 55 |
| 210 | 402 | 28 | 58 |
| 250 | 25 | 28 | 67 |
| 260 | 6 | 28 | 64 |
| 265 | 3 | 28 | 76 |
| 310 | 402 | 25 | 59 |
| 350 | 19.1 | 25 | 65 |
| 360 | 2 | 25 | 72 |
| 410 | 502 | 18 | 63 |
| 420 | 150 | 18 | 72 |
| 460 | 2.5 | 18 | 81 |

We claim:

1. An improved process for under water melt cutting of soft, tacky ethylene copolymers that have a tendency to agglomerate, which process comprises extruding molten thermoplastic polymer through one or more orifices into water and cutting the extruded strand as it undergoes solidification, wherein the improvement comprises adding to the water from about 1 to about 1000 ppm by weight of at least one water-soluble non-ionic surfactant selected from the group consisting of ethylene oxide and propylene oxide copolymers, oxyethylated straight chain alcohols and octyl phenoxy polyethoxy ethanol said surfactants increasing by at least 10° C. the agglomeration temperature of an ethylene polymer that has an agglomeration temperature of from about 50° C. to about 60° C., said surfactant having a hydrophilic/lipophilic balance (HLB) range of from about 10 to about 45, the addition of said surfactant resulting in the preparation of substantially agglomerate-free product.

2. The process of claim 1 wherein the HLB range of said non-ionic surfactant is from about 20 to about 35.

3. The process of claim 2 wherein said non-ionic surfactant is selected from the group consisting of ethylene oxide and propylene oxide copolymers.

4. The process of claim 3 wherein said non-ionic surfactant is selected from the group consisting of α-hydro-omega-hydroxy-poly(oxyethylene) poly(oxypropylene) poly(oxyethylene) block copolymers.

5. The process of claim 3 wherein said non-ionic surfactant is selected from the group consisting of α-hydro-omega-hydroxy-poly(oxyethylene) poly(oxypropylene) poly(oxyethylene) block copolymers having an average molecular weight of at least about 5000 and oxyethylated straight chain alcohols of at least about 1420 molecular weight.

6. The process of claims 2, 3, 4 or 5 wherein said surfactant is present in an amount of from about 1 to about 100 ppm based upon the weight of the water.

7. The process of claims 2, 3, 4 or 5 wherein said ethylene copolymer is ethylene/vinyl acetate copolymer having a vinyl acetate content of at least 18 percent by weight.

* * * * *